(12) United States Patent
Yin et al.

(10) Patent No.: US 9,210,441 B2
(45) Date of Patent: Dec. 8, 2015

(54) FAST MODE-DECISION ENCODING FOR INTERFRAMES

(75) Inventors: Peng Yin, Plainsboro, NJ (US); Alexandros Michael Tourapis, West Windsor, NJ (US); Jill MacDonald Boyce, Manalapan, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 3144 days.

(21) Appl. No.: 10/560,567

(22) PCT Filed: Jun. 17, 2004

(86) PCT No.: PCT/US2004/019527
§ 371 (c)(1),
(2), (4) Date: Dec. 12, 2005

(87) PCT Pub. No.: WO2005/004491
PCT Pub. Date: Jan. 13, 2005

(65) Prior Publication Data
US 2006/0193385 A1    Aug. 31, 2006

Related U.S. Application Data

(60) Provisional application No. 60/482,331, filed on Jun. 25, 2003.

(51) Int. Cl.
*H04N 19/577* (2014.01)
*H04N 19/11* (2014.01)
(Continued)

(52) U.S. Cl.
CPC ........... *H04N 19/577* (2014.11); *H04N 19/105* (2014.11); *H04N 19/107* (2014.11);
(Continued)

(58) Field of Classification Search
CPC ... H04N 19/577; H04N 19/51; H04N 19/176; H04N 19/109; H04N 19/105
USPC .................. 375/240, 240.01, 240.02, 240.08, 375/240.12–240.16, 240.22, 240.24, 240.25
See application file for complete search history.

(56) References Cited

U.S. PATENT DOCUMENTS 5,926,573 A * 7/1999 Kim et al. ...................... 382/239
2002/0181790 A1 * 12/2002 Nakata .......................... 382/236
(Continued)

FOREIGN PATENT DOCUMENTS

JP    1179584    7/1989

OTHER PUBLICATIONS

"Rate Distortion Optimized Mode Selection for Very Low Bit Rate Video Coding and the Emerging H.263 Standard," by Thomas Wiegand, Michael Lightstone, Debargha Mukherjee, T. George Campbell, and Sanjit K. Mitra, IEEE Transactions on Circuits and Systems for Video Technology, Apr. 1996, pp. 182-190.*
(Continued)

*Primary Examiner* — Eric A Rust
(74) *Attorney, Agent, or Firm* — Robert D. Shedd

(57) ABSTRACT

A video encoder and corresponding methods are provided for selecting the mode of a current macroblock of an inter-coded frame, including one or more of checking first modes for a subset of macroblock modes, selectively checking other modes in response to motion vector information of the checked first modes, and selecting the mode for the current macroblock in response to the checked modes; checking the macroblock mode of at least one neighboring macroblock, and selecting the mode for the current macroblock in response to the macroblock mode of the at least one checked neighboring macroblock; checking the cost of a subset of macroblock modes, further checking only intra-coded modes if the checked cost meets a preset criteria, and selecting the mode for the current macroblock in response to the checked modes; and adjusting an early-stopping threshold in response to checked macroblock modes, and selecting the mode for the current macroblock in response to the checked macroblock modes if the adjusted early-stopping threshold is met.

36 Claims, 3 Drawing Sheets

(51) Int. Cl.
  *H04N 19/176* (2014.01)
  *H04N 19/109* (2014.01)
  *H04N 19/196* (2014.01)
  *H04N 19/105* (2014.01)
  *H04N 19/139* (2014.01)
  *H04N 19/159* (2014.01)
  *H04N 19/147* (2014.01)
  *H04N 19/172* (2014.01)
  *H04N 19/51* (2014.01)
  *H04N 19/61* (2014.01)
  *H04N 19/593* (2014.01)
  *H04N 19/107* (2014.01)
  *H04N 19/132* (2014.01)
  *H04N 19/14* (2014.01)
  *H04N 19/19* (2014.01)
  *H04N 19/194* (2014.01)

(52) U.S. Cl.
  CPC .............. *H04N19/109* (2014.11); *H04N 19/11* (2014.11); *H04N 19/132* (2014.11); *H04N 19/139* (2014.11); *H04N 19/14* (2014.11); *H04N 19/147* (2014.11); *H04N 19/159* (2014.11); *H04N 19/172* (2014.11); *H04N 19/176* (2014.11); *H04N 19/19* (2014.11); *H04N 19/194* (2014.11); *H04N 19/196* (2014.11); *H04N 19/197* (2014.11); *H04N 19/51* (2014.11); *H04N 19/593* (2014.11); *H04N 19/61* (2014.11)

(56) References Cited

U.S. PATENT DOCUMENTS

| | | | |
|---|---|---|---|
| 2002/0196854 A1* | 12/2002 | Kim | 375/240.17 |
| 2003/0007692 A1* | 1/2003 | Chujoh et al. | 382/233 |
| 2003/0099292 A1* | 5/2003 | Wang et al. | 375/240.12 |
| 2003/0161402 A1* | 8/2003 | Horowitz | 375/240.16 |
| 2004/0202245 A1* | 10/2004 | Murakami et al. | 375/240 |
| 2004/0218674 A1* | 11/2004 | Kondo et al. | 375/240.16 |
| 2005/0063466 A1* | 3/2005 | Etoh et al. | 375/240.16 |

OTHER PUBLICATIONS

"MPEG Coding Performance Improvement by Jointly Optimizing Code Mode Decisions and Rate Control" by Huifang Sun, Wilson Kwak, Max Chien, and C.H. John Ju, IEEE Transactions on Circuits and Systems for Video Technology, Jun. 1997, pp. 449-458.*
"Efficient RD Optimized Macroblock Coding Mode Selection MPEG-2 Video Coding" by Yuen-Wen Lee, Faouzi Kossentini, and Rabab Ward, Proceedings of the International Conference on Image Processing, Oct. 1997, pp. 803-806.*
Bojun Meng, Oscar C. Au, "Fast Intra-Prediction Mode Selection for 4x4 Blocks in H.264", XP-002973809, pp. 389-392.
Anthony Joch, et al., "Performance Comparison of Video Coding Standards Using Lagrangian Coder Control", pp. 501-504.
A. Tamhankar and K. R. Rao, An Overview of H.264 / MPEG-4 Part 10, Jul. 2003, pp. 1-51.
Changsung Kim, et al., Multistage Mode Decision for Intra Prediction in H.264 Codec, XP-002285981. pp. 355-363.
International Search Report.

* cited by examiner

FAST MODE-DECISION ENCODING FOR INTERFRAMES

CROSS-REFERENCE TO RELATED APPLICATION

This application claims the benefit, under 35 U.S.C. §365 of International Application PCT/US2004/019527 filed Jun. 17, 2004, which was published in accordance with PCT Article 21(2) on Jan. 13, 2005 in English and which claims the benefit of U.S. provisional patent application No. 60/482,331 filed Jun. 25, 2003.

This application claims the benefit of U.S. Provisional Application Ser. No. 60/482,331, filed Jun. 25, 2003 and entitled "METHOD AND APPARATUS FOR FAST MODE DECISION FOR INTERFRAMES", which is incorporated herein by reference in its entirety.

FIELD OF THE INVENTION

The present invention is directed towards video encoders and decoders, and more particularly, towards encoders for making interframe mode decisions.

BACKGROUND OF THE INVENTION

In the JVT video compression standard, both inter and intra coding can be used for interframes. The encoder needs to make a mode decision for each macroblock based on coding efficiency and subjective quality considerations. An inter mode decision is associated with motion estimation, various block sizes and multiple reference picture selection. An intra mode decision is associated with various block types and multiple spatial prediction selections. Thus, mode decisions for interframes pose a large burden for the encoder. Accordingly, what is needed is a new scheme to reduce encoding decision complexity while maintaining coding efficiency.

SUMMARY OF THE INVENTION

These and other drawbacks and disadvantages of the prior art are addressed by an apparatus and method for fast mode-decision encoding of interframes.

A video encoder and corresponding methods are provided for selecting the mode of a current macroblock of an inter-coded frame, including one or more of checking first modes for a subset of macroblock modes, selectively checking other modes in response to motion vector information of the checked first modes, and selecting the mode for the current macroblock in response to the checked modes; checking the macroblock mode of at least one neighboring macroblock, and selecting the mode for the current macroblock in response to the macroblock mode of the at least one checked neighboring macroblock; checking the cost of a subset of macroblock modes, further checking only intra-coded modes if the checked cost meets a preset criteria, and selecting the mode for the current macroblock in response to the checked modes; and adjusting an early-stopping threshold in response to checked macroblock modes, and selecting the mode for the current macroblock in response to the checked macroblock modes if the adjusted early-stopping threshold is met.

These and other aspects, features and advantages of the present invention will become apparent from the following description of exemplary embodiments, which is to be read in connection with the accompanying drawings.

BRIEF DESCRIPTION OF THE DRAWINGS

The present invention may be better understood with reference to the following exemplary figures, in which.

DETAILED DESCRIPTION OF PREFERRED EMBODIMENTS

Figure 1:
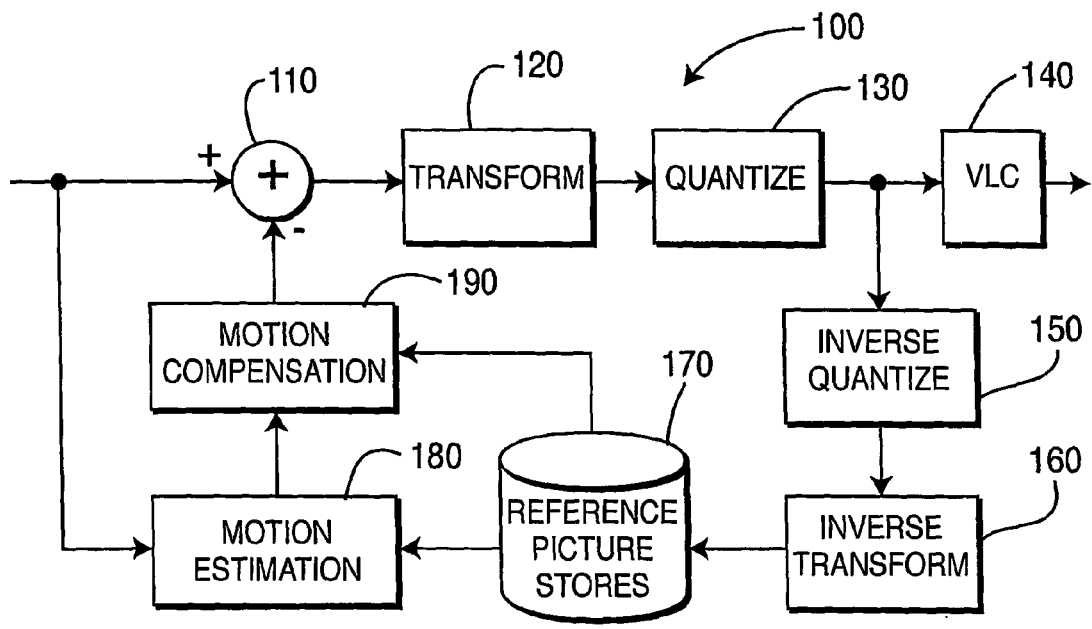
FIG. 1 shows a block diagram for a video encoder for fast mode-decision encoding according to an embodiment of the present invention.

Inter and intra coding methods are each used to encode interframes in compliance with video compression standards. Generally, an encoder makes an inter or intra coding decision for each macroblock based on coding efficiency and subjective quality considerations. In the JVT video compression standard, inter coding allows various block partitions in a 16×16 macroblock (in particular, 16×16, 16×8, 8×16, 8×8 for a macroblock, and 8×8, 8×4, 4×8, 4×4 for a 8×8 sub-macroblock), as well as multiple reference pictures. In addition, JVT also supports skip and intra modes. Intra modes include two types: INTRA4×4 and INTRA16×16, where INTRA4×4 supports 9 modes and INTRA16×16 supports 4 modes. All of these choices have made mode decisions very complicated. Embodiments of the present invention simplify mode decisions by reducing the number of potential candidate modes that need to be examined.

Both inter and intra coding are used for interframes (P and B frames) in JVT (which is also known as H.264 and MPEG AVC). Each individual macroblock is either coded as intra by using only spatial correlation, or coded as inter using temporal correlation from previously coded frames. Generally, an encoder makes an inter/intra coding decision for each macroblock based on coding efficiency and subjective quality considerations. Inter coding is typically used for macroblocks that are well predicted from previous pictures, and intra coding is generally used for macroblocks that are not well predicted from previous pictures, or for macroblocks with low spatial activity.

The JVT standard uses tree-structured hierarchical macroblock partitions. Inter-coded 16×16 pixel macroblocks may be broken into macroblock partitions of sizes 16×8, 8×16, or 8×8 pixels. Macroblock partitions of 8×8 pixels are also known as sub-macroblocks. Sub-macroblocks may be further broken into sub-macroblock partitions of sizes 8×4, 4×8, and 4×4 pixels. An encoder may select how to divide the macroblock into partitions and sub-macroblock partitions, based on the characteristics of a particular macroblock, in order to maximize compression efficiency and subjective quality.

Multiple reference pictures may be used for inter-prediction, with a reference picture index coded to indicate which of the multiple reference pictures is used. In P pictures (or P slices), only single directional prediction is used, and the allowable reference pictures are managed in list 0. In B pictures (or B slices), two lists of reference pictures are managed, list 0 and list 1. In B pictures (or B slices), single directional prediction using either list 0 or list 1 is allowed, and bi-prediction using both list 0 and list 1 is allowed. When bi-prediction is used, the list 0 and the list 1 predictors are averaged together to form a final predictor.

Each macroblock partition may have an independent reference picture index, prediction type (list 0, list 1, bipred), and an independent motion vector. Each sub-macroblock partition may have independent motion vectors, but all sub-macroblock partitions in the same sub-macroblock use the same reference picture index and prediction type.

For inter-coded macroblocks, P frames also support SKIP mode, while B frames support both SKIP and DIRECT modes. In SKIP mode, no motion and residual information is encoded. The motion information for a SKIP macroblock is the same as a motion vector predictor specified by the picture/slice type (P or B), and other information such as sequence and slice level parameters. The motion information is also related to other temporally or spatial adjacent macroblocks and its own macroblock position within the slice. In DIRECT mode, on the other hand, no motion information is encoded, but prediction residue is encoded. Both macroblocks and sub-macroblocks support DIRECT mode.

For intra-coded macroblocks, two block types are supported: 4×4 and 16×16. INTRA4×4 supports 9 prediction modes: vertical, horizontal, DC, diagonal down-left, diagonal down-right, vertical-left, horizontal-down, vertical-right and horizontal-up prediction. INTRA16×16 supports 4 prediction modes: vertical, horizontal, DC and plane prediction.

As for mode decisions, inter pictures need to support both inter and intra modes. Intra modes include INTRA4×4 and INTRA16×16. For P pictures, inter modes include SKIP and 16×16, 16×8, 8×16 and sub-macroblock 8×8 partitions. 8×8 further supports 8×8, 8×4, 4×8 and 4×4 partitions. For B pictures, consideration of both list 0 and list 1 and DIRECT mode are also considered for both macroblocks and sub-macroblocks.

In the JVT reference software, a Rate-Distortion Optimization (RDO) framework is used for mode decisions. For inter modes, motion estimation is considered separately from mode decisions. Motion estimation is first performed for all block types of inter modes, then the mode decision is made by comparing the cost of each inter mode and intra mode. The mode with the minimal cost is selected as the best mode.

The procedure to encode one macroblock s in a P- or B-picture is summarized as follows: Given the last decoded pictures, the Lagrangian multiplier $\lambda_{MODE}$, $\lambda_{MOTION}$, and the macroblock quantizer QP;

Step 1: Perform motion estimation and reference picture selection by minimizing:

$$J(REF,m(REF)\lambda_{MOTION})=SA(T)D(s,c(REF,m(REF))+\lambda_{MOTION}(R(m(REF)-p(REF))+R(REF)) \quad (eq:1)$$

for each reference picture and motion vector of a possible macroblock mode. In the equation, s is the original video signal and c is the coded video signal, m is the current motion vector being considered, REF denotes the reference picture, p is the motion vector used for the prediction during motion vector coding, R(m-p) represents the bits used for coding motion vector and R(REF) is the bits for coding reference picture. The SA(T)D is the Sum of Absolute (Transformed) Differences between original signal and reference signal predicted by the motion vector.

Step 2: Choose the macroblock prediction mode by minimizing:

$$J(s,c,MODE\backslash QP,\lambda_{MODE})=SSD(s,c,MODE\backslash QP)+\lambda_{MODE}\cdot R(s,c,MODE\backslash QP) \quad (eq:2)$$

given QP and $\lambda_{MODE}$ when varying MODE. SSD denotes Sum of Square Differences between the original signal and the reconstructed signal. R(s, c, MODE) is the number of bits associated with choosing MODE, including the bits for the macroblock header, the motion and all DCT coefficients. MODE indicates a mode out of the set of potential macroblock modes:

$$P\text{-frame:} \left\{ \begin{array}{l} INTRA4\times 4, INTRA16\times 16, SKIP, \\ 16\times 16, 16, 8, 8\times 16, 8\times 8, 8\times 4, 4\times 8, 4\times 4 \end{array} \right\}$$

$$\text{MODE} \in$$

$$B\text{-frame:} \left\{ \begin{array}{l} INTRA4\times 4, INTRA16\times 16, BIDIRECT, DIRECT, \\ FWD16\times 16, FWD16\times 8, FWD8\times 16, FWD8\times 8, \\ FWD8\times 4 \\ FWD4\times 8, FWD4\times 4, BAK16\times 16, BAK16\times 8, \\ BAK8\times 16, BAK8\times 8, BAK8\times 4, BAK4\times 8, \\ BAK4\times 4 \end{array} \right\}$$

The INTRA4×4 contains modes:

$$\text{MODE} \in \left\{ \begin{array}{l} \text{vertical, horizontal, } DC, \text{diagonal-down-left,} \\ \text{diagonal-down-right, vertical-left, horizontal-down,} \\ \text{vertical-right, horizontal-up} \end{array} \right\}$$

and INTRA16×16 contains modes: MODE∈{vertical, horizontal, DC, plane}.

This description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a video encoder is indicated generally by the reference numeral 100. An input to the encoder 100 is connected in signal communication with a non-inverting input of a summing junction 110. The output of the summing junction 110 is connected in signal communication with a block transform function 120. The transform 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
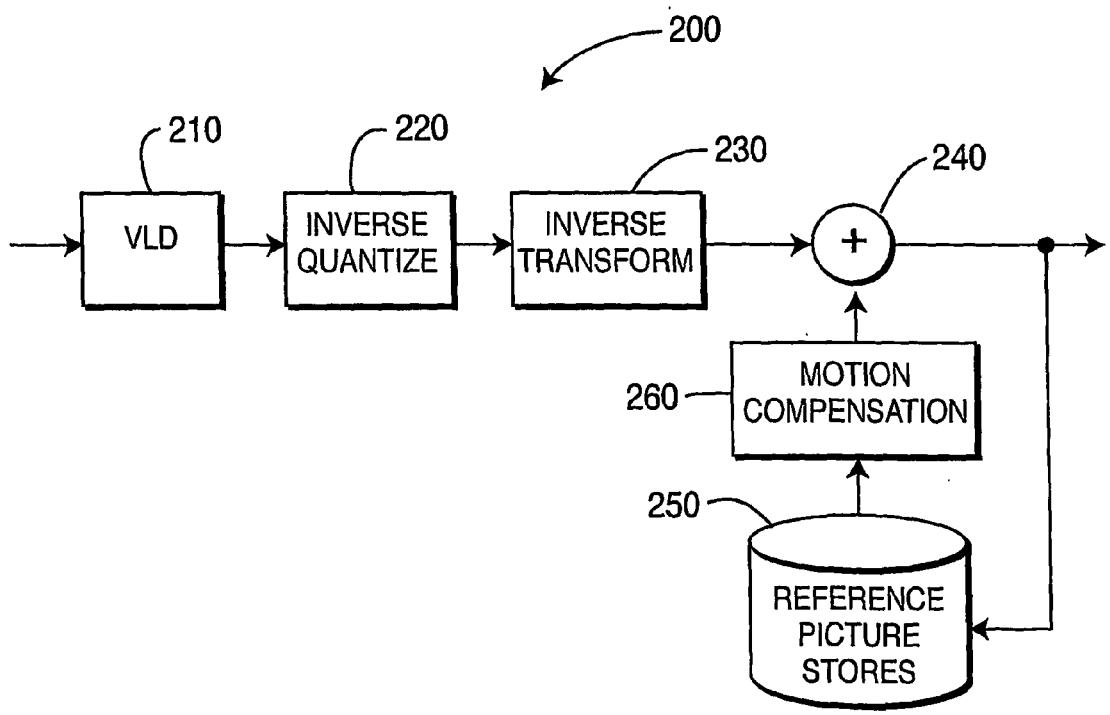
FIG. 2 shows a block diagram for a video decoder.

Turning to FIG. 2, a video decoder is indicated generally by the reference numeral 200. The video decoder 200 includes a variable length decoder ("VLD") 210 connected in signal communication with an inverse quantizer 220. The inverse quantizer is connected with an inverse transform 230. The inverse transform is connected in signal communication with a first input terminal of an adder or summing junction 240, where the output of the summing junction 240 provides the output of the video decoder 200. The output of the summing junction 240 is connected in signal communication with a reference picture store 250. The reference picture store 250 is connected in signal communication with a motion compensator 260, which is connected in signal communication with a second input terminal of the summing junction 240.

Figure 3:
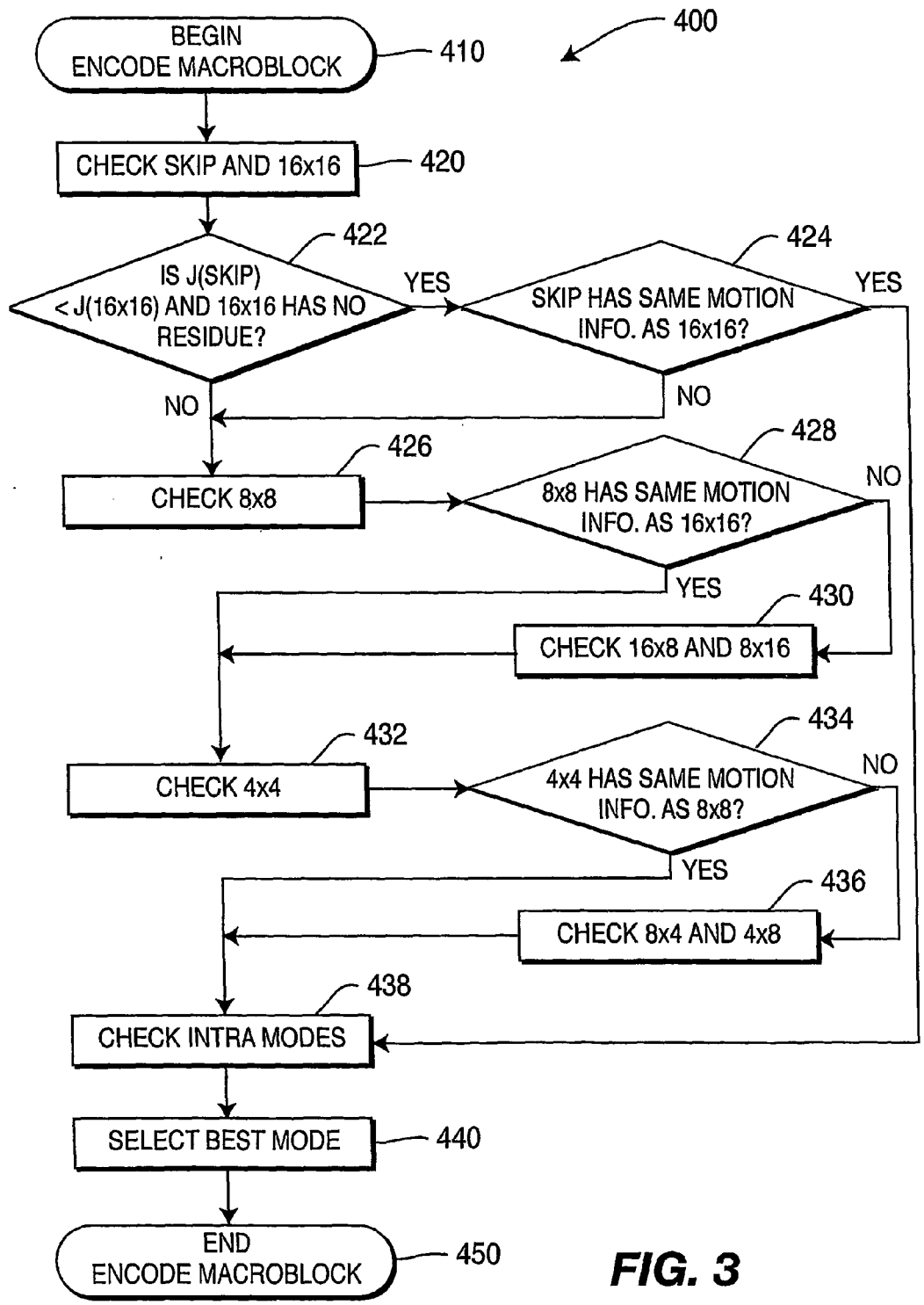
FIG. 3 shows a flowchart for an exemplary motion vector encoding decision process according to an embodiment of the present invention.

As shown in FIG. 3, an exemplary process for motion vector decision encoding for a macroblock in P picture is indicated generally by the reference numeral 400. A similar process may be applied for B pictures. The process includes a begin block 410 that passes control to a function block 420. The function block 420 checks for SKIP and 16×16 modes, and passes control to a decision block 422. The decision block 422 determines whether the conditions are true that a function J as in (eq:2) of SKIP mode is less than a function J of 16×16 mode and that 16×16 mode has no residue, and if not, passes control to the function block 426. If the conditions are true, control passes to a decision block 424. The decision block 424 checks whether the SKIP mode has the same motion information as the 16×16 mode, and if not, passes control to the function block 426. If so, the block 424 passes control ahead to a function block 438, and thereby skips checking of other inter modes.

The function block 426 performs an 8×8 mode check and passes control to a decision block 428, which checks whether an 8×8 mode has the same motion information as the 16×16 mode, and if so, passes control to a function block 432. If not, the block 428 passes control to a function block 430, which checks 16×8 and 8×16 modes, and passes control to the function block 432. The function block 432, in turn, checks a 4×4 mode, and passes control to a decision block 434. The decision block 434 determines whether the 4×4 mode has the same motion information as an 8×8 mode, and if so, passes control to a function block 438. If not, the function block 434 passes control to a function block 436, which checks 8×4 and 4×8 modes, and passes control to the function block 438. The function block 438 checks for intra modes, and passes control to a function block 440, which selects the best mode. The function block 440 passes control to an end block 450.

Figure 4:
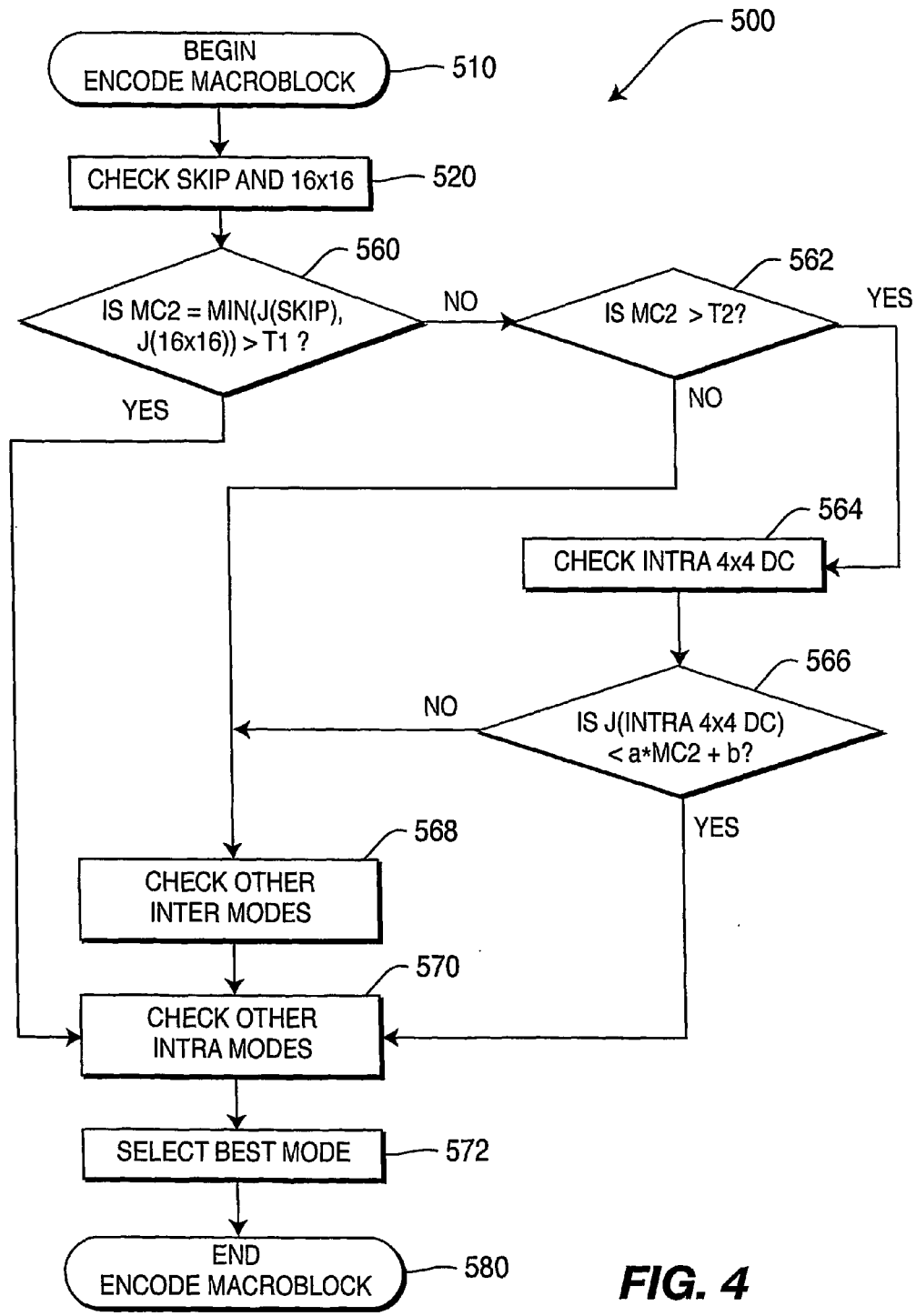
FIG. 4 shows a flowchart for an exemplary mixed inter and intra encoding decision process according to an embodiment of the present invention.

Turning to FIG. 4, an exemplary process for mixed inter and intra decision encoding for a macroblock is indicated generally by the reference numeral 500. The process includes a begin block 510 that passes control to a function block 520. The function block 520 checks for SKIP and 16×16 modes, and passes control to a decision block 560. The decision block checks if MC2, which is the minimum value between the function J evaluated for the SKIP mode and the function J evaluated for the 16×16 mode, is greater than a threshold T1. If so, control is passed ahead to a function block 570, but if not, control is passed to a decision block 562.

The block 562 checks whether the value MC2 from block 560 is greater than the a threshold T2 to do the comparison. If not, the block 562 passes control ahead to a function block 568, but if so, it passes control to a function block 564. The function block 564 checks the intra 4×4 DC mode, and passes control to a decision block 566. The decision block 566 determines whether the function J evaluated for the intra 4×4 DC mode is less than a value a times the value MC2 plus a value b, and if not, passes control to the function block 568, but if so, passes control to the function block 570. The function block 568 checks other inter modes and passes control to the function block 570. The function block 570, in turn, checks other intra modes and passes control to a function block 572, which selects the best mode and passes control to an end block 580.

Thus, in preferred embodiments of the present invention, a new algorithm is provided to alleviate the complexity on mode decisions for interframes by reducing the number of potential modes. The modes are divided into two categories: inter modes and intra modes, where inter modes include SKIP (and DIRECT for B pictures) modes and different block types (in particular, 16×16, 16×8, 8×16, 8×8, 8×4, 4×8, 4×4), and intra modes include INTRA4×4 and INTRA16×16. P pictures are used for description. The same idea can be extended to B pictures. For B pictures, in such an exemplary embodiment algorithm, SKIP mode and DIRECT mode are treated in the same way, and in sub-macroblock partitions, the DIRECT mode is also taken into consideration to select the best mode for the sub-macroblock.

Embodiments provide for four technical categories, which can be jointly or independently applied:

One category is for motion vector decisions. In this category, we will first check the quadratic modes: SKIP, 16×16, 8×8, 4×4. That is, the "quadratic modes" are a particular subset of the modes to be checked, which are these 4 modes: SKIP, 16×16, 8×8, and 4×4. The necessity to check other non-quadratic modes is based on the motion vector information (including motion itself, motion vector predictor and reference) of the quadratic modes. The decision of this category is based on the assumption that it is more efficient to select the largest block size that contains one object than a smaller block size that splits one object. We first check SKIP and 16×16 mode, and if J(SKIP)<J(16×16) (for simplicity, we write J(MODE) to denote the function J as in (eq:2) evaluated for MODE) and 16×16 has no residue, we check if SKIP has the same motion vector information as 16×16. If so, SKIP is selected, and there is no need to check other inter modes. Otherwise, we check 16×16 and 8×8. If they have the same motion vector information, i.e., 4 8×8 motion vectors have the same information as one 16×16, we will not check 16×8, 8×16, otherwise, we will first perform motion vector and reference selection as described above in (eq:1) for 16×8 and 8×16 respectively. If 16×8 has the same motion information as 16×16, no RDO calculation is required, because J(16×8) is believed to be larger than J(16×16).

We may also consider, even though not necessary, the motion vector predictors within such decision since if they are equal it is certain that J(16×16) would be smaller. The same procedure can be done for 8×16. We then check 4×4. For each sub-partition in an 8×8 block, if each of the four 4×4 block motion vectors have the same values as the 8×8 block, there is no need to check 4×8 and 8×4. Otherwise, we will first perform motion vector and reference selection for 4×8 and 8×4 respectively. If the two 8×4 blocks have the same motion values as the 8×8 block, no RDO calculation is required, because J(8×4) is believed to be larger than J(8×8). The same procedure can be done for 4×8. FIG. 3 shows an example for the motion vector decision. This process could also be performed immediately after integer motion estimation. If the integer motion vectors of the previously mentioned modes are the same, then we may also completely avoid performing sub-pixel refinement, thus reducing complexity even further.

Another category is for neighborhood decisions. H.264 uses block-coding structure and the object often tends to cross the block boundary. In this category, we will make use of neighborhood information to make mode decision faster.

If the mode of the upper macroblock is 16×16, and that of left macroblock is 16×8, then the mode of the current macroblock has a high probability to be 16×8. This can be further enhanced, if necessary, by considering the modes of other adjacent macroblocks, such as the one on the top-right or even of the co-located macroblock in the previous or reference picture. In this case only SKIP, 16×16 and 16×8 need to be checked, while other inter modes can be completely ignored. A similar consideration can be performed for 8×16, in particular if the mode of the left macroblock is 16×16, and that of the upper macroblock is 8×16, then only SKIP, 16×16 and 8×16 need to be checked. The same criterion can be used for sub-macroblock mode decision. That is, if the mode of the upper 8×8 block is 8×8, and that of left is 8×4, only 8×4 needs to be checked; if the mode of the upper 8×8 is 4×8 and that of left is 8×8, only 4×8 needs to be checked. If the mode of upper macroblock and left macroblock is intra, then only SKIP, 16×16 and intra modes need to be checked.

A relatively similar decision could also be applied by using temporally adjacent macroblocks (i.e. the co-located macroblock). In particular, after examining a specific mode (i.e. 16×16), if the best mode and the associated motion information are identical to that of this temporally adjacent macroblock, we can immediately terminate mode decision and avoid examining any other mode. This process could be further enhanced through the consideration of the associated distortion (e.g. if distortion of current macroblock is smaller than that of the co-located, or of a linear/non-linear combination of other temporally or/and even spatially adjacent macroblock distortions, then there is even higher probability that the termination would be correct).

Yet another category is for mixed inter and intra mode decisions. Generally, all inter modes are checked before intra modes. In this category, we will introduce a technique to mix the checking order of inter and intra modes. Two thresholds (T1 and T2, where T1>T2) are set. We first check SKIP and 16×16. If the minimum cost of these two, denoted by MC2 is larger than T1, we will continue to check intra modes, no other inter modes will be checked. If MC2 is larger than T2, we will first check INTRA4×4 DC mode. If the cost is smaller than a×MC2+b, where a and b can be given weight/offset parameters, only intra modes are checked; otherwise, both inter and intra modes are checked. FIG. 4 shows an example for the mixed inter-intra mode decision.

An additional category is for an early stopping decision. Instead of exhaustively checking all possible modes, in our preferred embodiments of the present invention, we use early stopping criteria to reach fast mode decision. These stopping criteria are based on an adaptive thresholding mechanism. If one threshold for one particular mode is met, we stop checking other left modes. One example of how to select thresholding T for one mode T(mode) is described in this invention by equation (4). In the equation, $\alpha$(mode) and $\beta$(mode) are the scalars for one mode. COST can be J, SAD, or SSD in (eq:1)(eq:2). $COST_i$ denotes the cost for ith neighboring block.

$$T(\text{mod } e) = \alpha(\text{mod } e) \times T_n + \beta(\text{mod } e), \qquad (\text{eq: 4})$$

where $$T_n = \text{MAX}(COST_{lowbound}, \text{MIN}(COST_{highbound}, COST_1, COST_2, \ldots COST_n))$$

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. In a video encoder having a processor, a video encoding method for encoding a current macroblock of an inter-coded frame, the method comprising at least one of:
   checking first modes for a subset of macroblock modes, selectively checking other modes in response to motion vector information of the checked first modes, and selecting the mode for the current macroblock in response to the checked modes;
   checking the macroblock mode of at least one neighboring macroblock, and selecting the mode for the current macroblock in response to the macroblock mode of the at least one checked neighboring macroblock;
   checking the cost of a subset of macroblock modes, further checking only intra-coded modes if the checked cost meets a criteria, and selecting the mode for the current macroblock in response to the checked modes; and
   adjusting an early-stopping threshold in response to checked macroblock modes, and selecting the mode for the current macroblock in response to the checked macroblock modes if the adjusted early-stopping threshold is met,
   wherein the method further comprises encoding the current macroblock using the selected mode for the current macroblock.

2. A video encoding method as defined in claim 1, the method comprising checking first modes for a subset of macroblock modes, selectively checking other modes in response to motion vector information of the checked first modes, and selecting the mode for the current macroblock in response to the checked modes.

3. A video encoding method as defined in claim 1 wherein said first modes comprise the quadratic modes of SKIP, 16×16, 8×8, and 4×4.

4. A video encoding method as defined in claim 1, further comprising checking the macroblock mode of at least one neighboring macroblock, and selecting the mode for the current macroblock in response to the macroblock mode of the at least one checked neighboring macroblock.

5. A video encoding method as defined in claim 1, further comprising checking the cost of a subset of macroblock modes, further checking only intra-coded modes if the checked cost meets a criteria, and selecting the mode for the current macroblock in response to the checked modes.

6. A video encoding method as defined in claim 1, further comprising adjusting an early-stopping threshold in response to checked macroblock modes, and selecting the mode for the current macroblock in response to the checked macroblock modes if the adjusted early-stopping threshold is met.

7. A video encoding method as defined in claim 6 wherein the early stop criteria are based on adaptive thresholding to stop checking other inter or intra modes.

8. A video encoding method as defined in claim 1, further comprising:
   initially performing motion estimation only for a subset of the possible block sizes; and
   using the motion information to determine if other motion estimation or complexity measures should be performed for other block sizes.

9. A video encoding method as defined in claim 8 wherein said first modes are checked first and their motion information is used to decide if other modes needs to be checked.

10. A video encoding method as defined in claim 1 wherein spatial/temporal neighboring macroblock and block partition information is used to decide the subset of possible block sizes or inter/intra modes that need to be checked.

11. A video encoding method as defined in claim 1, further comprising:
    initially performing mode checking for a subset of both inter modes and intra modes;
    calculating a complexity measure responsive to the mode checking; and
    using the complexity measure to determine if other inter modes and intra modes should be performed.

12. A video encoding method as defined in claim 1 wherein early termination takes place if spatially or/and temporally neighboring macroblocks have a specific relationship with the motion information of the current macroblock after examining a specific mode.

13. A video encoder having a processor for encoding a current macroblock of an inter-coded frame, the encoder comprising the processor and at least one of:
    first means for checking the first modes for a subset of macroblock modes, selectively checking other modes in response to motion vector information of the checked first modes, and selecting the mode for the current macroblock in response to the checked modes;
    macroblock means for checking the macroblock mode of at least one neighboring macroblock, and selecting the mode for the current macroblock in response to the macroblock mode of the at least one checked neighboring macroblock;
    subset means for checking the cost of a subset of macroblock modes, further checking only intra-coded modes if the checked cost meets a criteria, and selecting the mode for the current macroblock in response to the checked modes; and
    stopping means for adjusting an early-stopping threshold in response to checked macroblock modes, and selecting the mode for the current macroblock in response to the checked macroblock modes if the adjusted early-stopping threshold is met,
    wherein the encoder further comprises means for encoding the current macroblock using the selected mode for the current macroblock.

14. A video encoder as defined in claim 13, the encoder comprising first-checking means for checking first modes for a subset of macroblock modes, selectively checking other modes in response to motion vector information of the checked first modes, and selecting the mode for the current macroblock in response to the checked modes.

15. A video encoder as defined in claim 13 wherein said first modes comprise the quadratic modes of SKIP, 16×16, 8×8, and 4×4.

16. A video encoder as defined in claim 13, further comprising neighbor-checking means for checking the macroblock mode of at least one neighboring macroblock, and selecting the mode for the current macroblock in response to the macroblock mode of the at least one checked neighboring macroblock.

17. A video encoder as defined in claim 13, further comprising intra-checking means for checking the cost of a subset of macroblock modes, further checking only intra-coded modes if the checked cost meets a criteria, and selecting the mode for the current macroblock in response to the checked modes.

18. A video encoder as defined in claim 13, further comprising thresholding means for adjusting an early-stopping threshold in response to checked macroblock modes, and selecting the mode for the current macroblock in response to the checked macroblock modes if the adjusted early-stopping threshold is met.

19. A video encoder as defined in claim 18 wherein the early stop criteria are based on adaptive thresholding to stop checking other inter or intra modes.

20. A video encoder as defined in claim 13, further comprising:
motion-estimation means for initially performing motion estimation only for a subset of the possible block sizes; and
determination means for using the motion information to determine if other motion estimation or complexity measures should be performed for other block sizes.

21. A video encoder as defined in claim 20 wherein said first modes are checked first and their motion information is used to decide if other modes needs to be checked.

22. A video encoder as defined in claim 13 wherein spatial/temporal neighboring macroblock and block partition information is used to decide the subset of possible block sizes or inter/intra modes that need to be checked.

23. A video encoder as defined in claim 13, further comprising:
inter/intra checking means for initially performing mode checking for a subset of both inter modes and intra modes;
complexity means for calculating a complexity measure responsive to the mode checking; and
inter/intra determination means for using the complexity measure to determine if other inter modes and intra modes should be performed.

24. A video encoder as defined in claim 13 wherein early termination takes place if spatially or/and temporally neighboring macroblocks have a specific relationship with the motion information of the current macroblock after examining a specific mode.

25. A computer readable non-transitory medium for performing a method for selecting a mode of a current macroblock of an inter-coded frame, the method comprising at least one of:
checking first modes for a subset of macroblock modes, selectively checking other modes in response to motion vector information of the checked first modes, and selecting the mode for the current macroblock in response to the checked modes;
checking the macroblock mode of at least one neighboring macroblock, and selecting the mode for the current macroblock in response to the macroblock mode of the at least one checked neighboring macroblock;
checking the cost of a subset of macroblock modes, further checking only intra-coded modes if the checked cost meets a criteria, and selecting the mode for the current macroblock in response to the checked modes; and
adjusting an early-stopping threshold in response to checked macroblock modes, and selecting the mode for the current macroblock in response to the checked macroblock modes if the adjusted early-stopping threshold is met,
wherein the method further comprises encoding the current macroblock using the selected mode for the current macroblock.

26. A computer readable non-transitory medium as defined in claim 25, the method comprising checking first modes for a subset of macroblock modes, selectively checking other modes in response to motion vector information of the checked first modes, and selecting the mode for the current macroblock in response to the checked modes.

27. A computer readable non-transitory medium as defined in claim 25 wherein said first modes comprise the quadratic modes of SKIP, 16×16, 8×8, and 4×4.

28. A computer readable non-transitory medium as defined in claim 25, the method further comprising checking the macroblock mode of at least one neighboring macroblock, and selecting the mode for the current macroblock in response to the macroblock mode of the at least one checked neighboring macroblock.

29. A computer readable non-transitory medium as defined in claim 25, the method further comprising checking the cost of a subset of macroblock modes, further checking only intra-coded modes if the checked cost meets a criteria, and selecting the mode for the current macroblock in response to the checked modes.

30. A computer readable non-transitory medium as defined in claim 25, the method further comprising adjusting an early-stopping threshold in response to checked macroblock modes, and selecting the mode for the current macroblock in response to the checked macroblock modes if the adjusted early-stopping threshold is met.

31. A computer readable non-transitory medium as defined in claim 30 wherein the early stop criteria are based on adaptive thresholding to stop checking other inter or intra modes.

32. A computer readable non-transitory medium as defined in claim 25, the method further comprising:
initially performing motion estimation only for a subset of the possible block sizes; and
using the motion information to determine if other motion estimation or complexity measures should be performed for other block sizes.

33. A computer readable non-transitory medium as defined in claim 32 wherein said first modes are checked first and their motion information is used to decide if other modes needs to be checked.

34. A computer readable non-transitory medium as defined in claim 25 wherein spatial/temporal neighboring macroblock and block partition information is used to decide the subset of possible block sizes or inter/intra modes that need to be checked.

35. A computer readable non-transitory medium as defined in claim 25, the method further comprising:
initially performing mode checking for a subset of both inter modes and intra modes;
calculating a complexity measure responsive to the mode checking; and
using the complexity measure to determine if other inter modes and intra modes should be performed.

36. A computer readable non-transitory medium as defined in claim 25 wherein early termination takes place if spatially or/and temporally neighboring macroblocks have a specific relationship with the motion information of the current macroblock after examining a specific mode.

\* \* \* \* \*